US006774342B2

(12) United States Patent
Capriotti et al.

(10) Patent No.: US 6,774,342 B2
(45) Date of Patent: Aug. 10, 2004

(54) GLAZING WITH ELECTRICAL TERMINAL

(75) Inventors: Luigi Capriotti, Benedetto del Tronto AP (IT); Ciro Paudice, Vasto (IT)

(73) Assignee: Societa Italiana Vetro - Siv S.p.A., San Salvo (IT)

( * ) Notice: Subject to any disclaimer, the term of this patent is extended or adjusted under 35 U.S.C. 154(b) by 0 days.

(21) Appl. No.: 10/181,887

(22) PCT Filed: Jan. 25, 2001

(86) PCT No.: PCT/IT01/00038

§ 371 (c)(1),
(2), (4) Date: Oct. 25, 2002

(87) PCT Pub. No.: WO01/56334

PCT Pub. Date: Aug. 2, 2001

(65) Prior Publication Data

US 2003/0180545 A1 Sep. 25, 2003

(30) Foreign Application Priority Data

Jan. 25, 2000 (EP) ........................................... 00830043

(51) Int. Cl.$^7$ .................................................. B60L 1/02
(52) U.S. Cl. ....................................... 219/203; 219/219
(58) Field of Search ................................ 219/203, 522, 219/541, 547, 543; 362/492; 428/209; 524/271; 29/854; 156/91, 99, 235; 136/244

(56) References Cited

U.S. PATENT DOCUMENTS 3,658,618 A * 4/1972 Gramann .................... 156/235
3,849,880 A * 11/1974 Haynos ....................... 29/854
3,918,783 A * 11/1975 DuRocher et al. ............ 439/55
4,388,522 A * 6/1983 Boaz .......................... 219/522
4,396,826 A * 8/1983 Orcutt et al. ............... 219/522
4,488,033 A 12/1984 Trachtenberg
4,635,415 A * 1/1987 Schumacher et al. ...... 52/127.1
4,755,659 A * 7/1988 Leon et al. ................. 219/547
4,865,998 A * 9/1989 Feickert et al. ............. 436/548
4,874,930 A * 10/1989 Voss et al. .................. 219/522
4,920,254 A * 4/1990 DeCamp et al. ............ 219/547
5,006,179 A * 4/1991 Gaddy ........................ 136/244
5,026,752 A * 6/1991 Wakabayashi et al. ...... 524/271
5,521,357 A * 5/1996 Lock et al. ................. 219/543
5,539,186 A * 7/1996 Abrami et al. .............. 219/548

(List continued on next page.)

FOREIGN PATENT DOCUMENTS

DE 019829151 C1 * 2/2000 ............ H05B/3/86
EP 0 278 611 A1 8/1988
EP 0 410 766 A1 1/1991
EP 0 763 869 B1 11/2002
FR 2 519 477 7/1983
GB 1 393 887 5/1975
GB 2 223 385 A 4/1990
JP 2000030847 * 1/2000 ............. B60S/1/02

*Primary Examiner*—Denise Pothier
*Assistant Examiner*—Leonid Fastovsky
(74) *Attorney, Agent, or Firm*—Burns, Doane, Swecker & Mathis, L.L.P.

(57) ABSTRACT

A glazing provided with an electric circuit includes an electrically conducting substrate and a terminal for making electrical connection thereto. The terminal is attached to the glazing by an adhesive, rather than solely by solder, and the electrical connection between the terminal and the substrate is provided by means other than, or additional to, physical contact between the terminal and the substrate. For instance, the adhesive may be electrically conducting, or a soldered joint may additionally be provided if the adhesive is electrically insulating, or of insufficient conductivity for the type of circuit in question. The adhesive may be pre-applied to the terminal, and may be a tack-free adhesive activated or cured by heat. The terminal may be in two parts, with the base part of a standardized design. The glazing is suitable for use in buildings, appliances or vehicles, especially automotive vehicles.

20 Claims, 3 Drawing Sheets

U.S. PATENT DOCUMENTS 5,565,261 A * 10/1996 Carson et al. .............. 428/209
5,587,236 A * 12/1996 Agrawal et al. ............ 428/334
6,075,708 A * 6/2000 Nakamura .................. 361/752
6,079,343 A * 6/2000 Wong .................... 112/475.09
6,320,159 B1 * 11/2001 Topp .......................... 219/203
6,386,741 B1 * 5/2002 Jones et al. ................. 362/492
6,512,203 B2 * 1/2003 Jones et al. ................. 219/219
2001/0004534 A1 * 6/2001 Carter-Coman et al. ...... 438/29
2002/0063311 A1 * 5/2002 Siniaguine ................. 257/621

* cited by examiner

GLAZING WITH ELECTRICAL TERMINAL

DESCRIPTION

The present invention relates to a glazing provided with an electric circuit including an electrically conducting substrate and a terminal for making electrical connection thereto. In particular, the circuit may be a heating element for defrosting or demisting the glazing, or an antenna circuit. The glazing may be for a vehicle window, or a window for an appliance or a building; in the case of a vehicle it may be a windscreen or rear window.

Various techniques are known for making electrical connection to a terminal. For instance, it is known from GB-A-2 223 385 to solder a terminal to a busbar or current collector. Alternatively, EP-A-410 766 discloses an electrical device comprising a substrate supporting a film-type heater track formed of conductive polymer ink. A connector member is bonded to the substrate by means of adhesive, and the heater track overlies at least an end portion of the connector member to provide an electrical contact between them.

It is also known from EP 278 611 A1 to employ an electrically conductive adhesive to bond a busbar onto a conductive layer formed on a substrate, which may be used as a window. Furthermore, in GB 1 393 887, the use of steel filings to make electrical contact through an adhesive coating is disclosed in the context of a rear window heating circuit.

However, FR 2 519 477 teaches that electrically conductive adhesives have various disadvantages, for example, they are not sufficiently durable under the conditions to which a vehicle window is typically subjected, and they are expensive. Instead, FR 2 519 477 suggests that it is preferable to employ a non-conductive adhesive to maintain a suitably configured terminal in intimate contact with an electrically conducting substrate so as to ensure electrical continuity.

Unfortunately, the invention of FR 2 519 477 is also not without disadvantages; it has been found that the inevitable mismatch of the thermal expansion coefficients of glass, metal and adhesive results in a weakening of the adhesive bond to the extent that electrical contact is adversely affected. Consequently, soldering remains a widely used technique for attaching electrical terminals to glazings, although the strength of the bonds produced is not always satisfactory, and there are increasing environmental concerns about metals, such as lead, which are commonly used in solders. Furthermore, the actual soldering operation is inclined to produce thermal stresses in the glass, which sometimes lead to damage.

It would be desirable to improve the attachment of electrical terminals to glazings, avoiding the disadvantages described above.

According to the present invention there is provided a glazing with an electric circuit including an electrically conducting substrate and a terminal for making electrical connection thereto, wherein the terminal is attached to the substrate by adhesive, characterised in that the electrical connection between the terminal and the substrate is provided by means other than, or additional to, physical contact between the terminal and the substrate.

The provision of a secure and reliable electrical connection between the terminal and the substrate allows adhesives to replace solder without attendant problems of electrical continuity. Modern adhesives are able to offer many advantages over solder. They may be flexible in the cured or set condition, and thereby absorb stresses generated in, or exerted on, the terminal. Adhesives are available which do not require to be heated in order to form a bond, or only need to be heated to a modest temperature, and yet which still provide a strong bond. Furthermore, it is usually possible to arrange the manufacturing operation so that the adhesive is heated just before it contacts the glazing, thereby avoiding the need to heat the glazing directly. Durable electrically conducting adhesives are now available, thereby allowing the adhesive to fulfil both the mechanical and electrical functions of a conventional soldered joint. Generally, such adhesives contain finely dispersed metal powder to make them conductive. Providing that the electric current to be carried is not large, the adhesive constitutes a sufficient electrical connection. A further important advantage is that suitable adhesives are available which have fewer health and safety hazards and less adverse environmental impact than the conventionally used solders.

Preferably the terminal comprises separate base and connector parts which are adapted to mutually engage, and the base part of the terminal is attached to the glazing by adhesive.

Advantageously, especially in the automotive industry, the base may be of a standardised design of general applicability, whereas the connector part may be tailored to the specific requirements of a particular glazing, vehicle or vehicle manufacturer. That is, the base is preferably usable with a variety of differing designs of connector part.

Means of electrical connection between the terminal and the substrate may, for example, include the use of an electrically conducting adhesive, and/or a soldered connection. In high current applications, a joint soldered directly between the terminal and the substrate is preferable as the additional means of electrical connection, in order to obtain a low resistance connection. In this situation the solder complements the adhesive, as the latter bears the mechanical load and stresses, leaving the solder to provide, or enhance, electrical continuity without being compromised. This makes it possible, for instance, to use solders which are less environmentally aggressive, even if there is some loss in bond strength.

The invention also provides a method of making a glazing with an electric circuit including an electrically conducting substrate and a terminal for making electrical connection thereto, comprising the steps of:

providing a pane carrying the electric circuit and substrate, and attaching the terminal to the substrate with adhesive, characterised by providing the electrical connection between the terminal and the substrate by means other than or additional to, physical contact between the terminal and the substrate.

Improvements can also be made in the type and method of application of the adhesive.

Preferably the adhesive is provided in the form of a tack-free tablet which is placed in contact with the terminal. The use of a tack-free (i.e. non-sticking) form of adhesive is advantageous because handling of the adhesive is greatly facilitated.

It is also preferable for the adhesive to be pre-shaped to match the part of the terminal that the tablet is in contact with. This increases the area of the terminal that is bonded, and hence the strength of the bond, while reducing the likelihood of adhesive escaping from underneath the terminal and becoming visible, which is likely to be unsightly. It also results in less waste and hence a cost reduction.

Advantageously the adhesive is pre-applied to the terminal, e.g. the terminals may be supplied with adhesive already applied to the requisite part of the terminal.

Optionally the adhesive may be heated to activate or cure it. The term "activating" an adhesive is used to refer to any process which initiates the bonding process, e.g. one which makes a previously tack-free adhesive sticky, or one which starts the curing process. Activation may involve melting the adhesive (at least on its surface), initiating a heat-dependent chemical reaction, or removing or destroying a barrier which separates two reactants. The extent of heating an adhesive is frequently less than is required for solder, and with regard to heating for activation, the adhesive need not necessarily be in contact with the glazing at the time of heating.

In this specification, the 'term "solder" is used to denote a fusible alloy of metals. The term "adhesive" is used to denote a substance employed to bond other substances together, but does not include a solder as such. An adhesive may be wholly non-metallic or may contain a metallic component.

The invention will now be further described by way of the following specific embodiments, which are given by way of illustration and not of limitation, and with reference to the accompanying drawings in which.

Figure 5A:
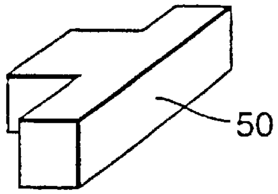
Figure 5B:
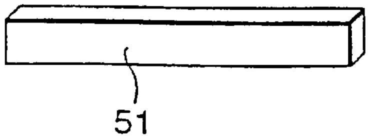
Figure 5C:
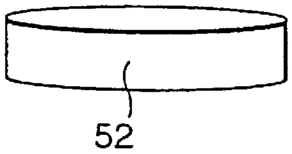

FIGS. 5 (*a*)–(*c*) are perspective views of pre-shaped tablets of adhesive.

Figure 1:
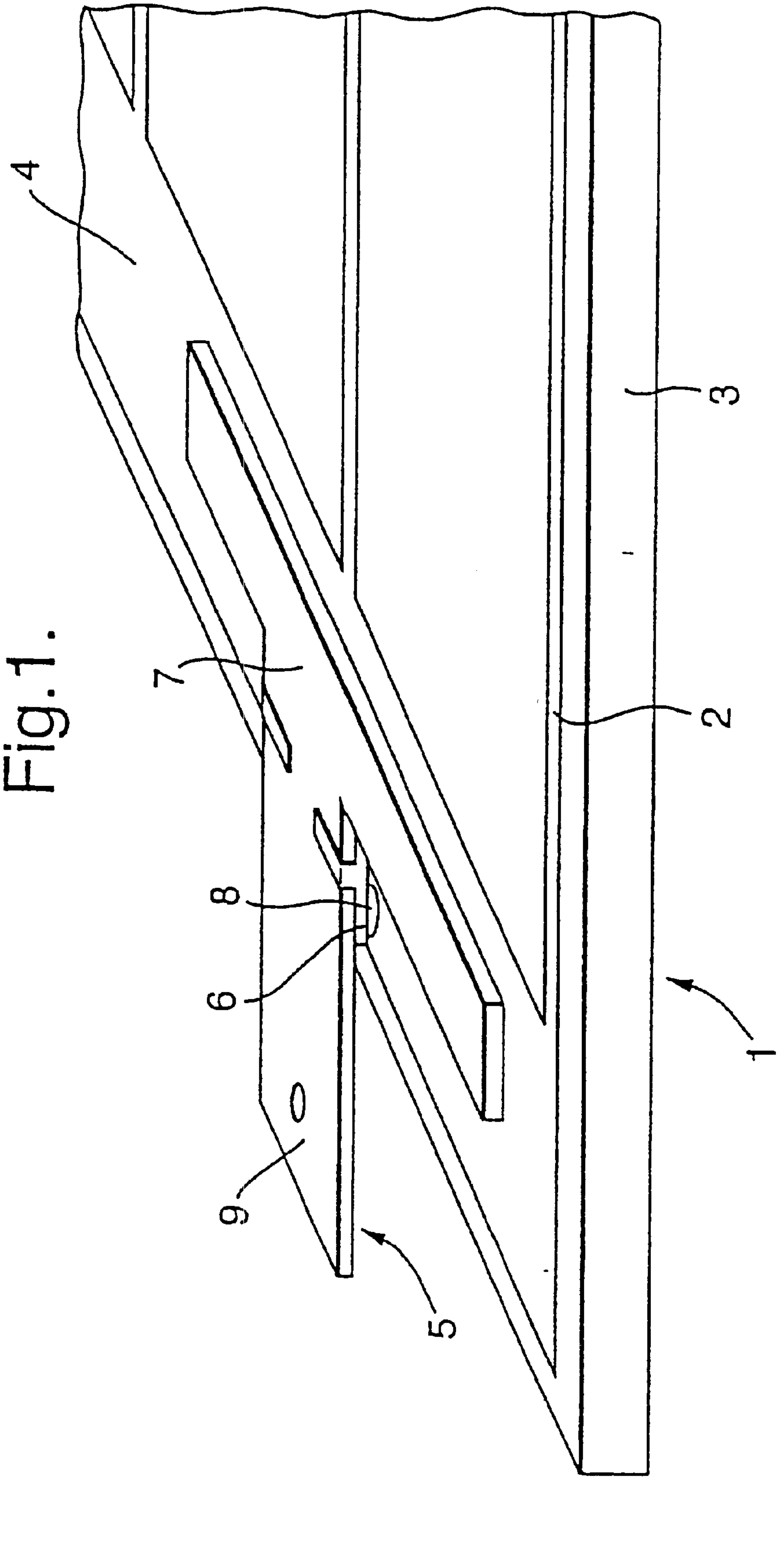
FIG. 1 is a perspective view of part of a glazing which includes an electric circuit and has a terminal attached.

FIG. 1 illustrates a glazing 1 including an electric circuit 2. In this case the electric circuit is a resistive heating circuit printed on a pane 3 of glazing material in a conductive ink. Such circuits are used for defrosting and demisting, e.g. in vehicles, and as they are well known they need not be described further. Other equally well-known heating circuits comprise fine wires or a thin electroconductive coating on the pane. Alternatively the circuit may be an antenna circuit, again as is well-known.

The pane 3 of glazing material may be a sheet of glass, which may be annealed or toughened, or a composite pane made up of two or more plies of glass (or other glazing material) laminated together. In the case of an automotive glazing, the glass would be safety glass, i.e. toughened or laminated glass. There are alternative glazing materials to glass including various plastics such as polycarbonate for example.

Attached to the glazing, or more precisely, to an electrically conducting substrate 4 which forms part of the-electric circuit 2, is a terminal 5. The embodiment of terminal 5 shown in FIG. 1 comprises a base part 6 and an upper (as illustrated) or connector part 7, which are adapted to mutually engage, as will be explained in more detail below in connection with FIG. 2. The base part 6 is attached to the glazing 1 by adhesive 8, again as will be explained in more detail below. The terminal may be in intimate physical contact with the substrate, but this is not necessary since an alternative means of electrical connection is provided, as described below.

In this embodiment, the electrically conducting substrate 4 constitutes a busbar supplying current to heating elements of the electric circuit 2. The substrate may be composed of thin sheet metal, such as a foil, or may be made from an ink which is applied to the pane (e.g. by screen printing), dried, and fired to provide a durable conducting path. For example, silver-containing inks are widely used in the manufacture of electrically heated rear windows for vehicles.

The terminal 5 includes a spade connector 9, to which an electrical lead (not shown) may be attached in conventional fashion by a corresponding female connector. Many variations on the type and embodiment of connector are possible; for example, it may be cranked, or otherwise bent, to facilitate access or to improve its aesthetic aspect. Alternative forms of connector, e.g. the press stud type, may also be used. The terminal may be manufactured from thin sheet metal; in particular, copper sheet, preferably tinned to prevent oxidation, is a suitable material.

Figure 2:
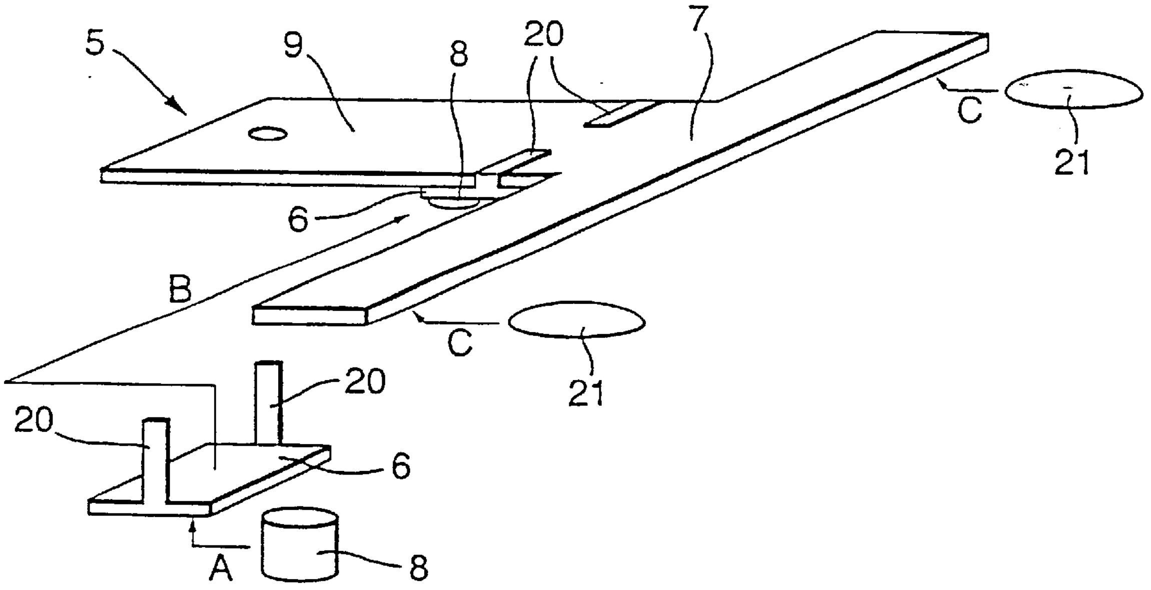
FIG. 2 is a perspective view of a terminal which comprises separate base and connector portions.

FIG. 2 shows more details of the terminal 5. As already mentioned, the terminal 5 comprises a base part 6 and a connector part 7, which are adapted to mutually engage each other. For example, base part 6 may be provided with tabs 20, which are bent around the connector part 7, e.g. around the spade 9.

It has already been mentioned that it is convenient for the terminals to be supplied with the adhesive pre-applied, especially in a tack-free form. The tablet of adhesive (generally comprising pre-mixed components) is pressed onto the surface of the terminal with just sufficient heat to cause it to adhere to the surface. When the terminal is in two (or more parts) as in FIGS. 1 and 2, it is especially convenient for the base part 6 to be of a standard universal design, with the adhesive pre-applied to it. This means that only one design of base part need be purchased, which is then used with a connector part which suits the particular vehicle glazing being manufactured. The base part may either be attached to the glazing first, or to the connector first, whichever is more convenient. In FIG. 2, a tablet of adhesive 8 is applied to the terminal base part 6, as indicated by arrow A. The base part is then attached to the connector part 7 by means of tabs 20, as indicated by arrow B. Finally the terminal is attached to the glazing, as will be described below.

The adhesive may be electrically conducting, in which case no further electrical connection may be necessary. However, if the adhesive is non-conducting, or if the electric circuit has a high power requirement, a means of electrical connection will be required between the terminal and the electric circuit. This may conveniently be provided by a soldered joint between the terminal and the electrically conducting substrate. In FIG. 2, the application of solder is diagrammatically represented by arrows C and solder 21. For an antenna, which of course only produces a very small current, the use of a conducting adhesive may often provide sufficient electrical connection.

Figure 3:
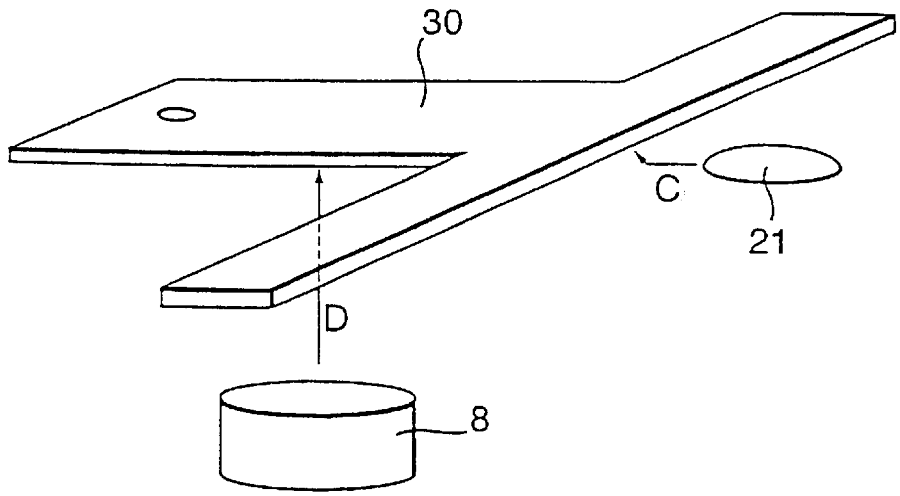
FIG. 3 is a perspective view of a one-part terminal.

FIG. 3 shows an alternative embodiment of terminal 30. This is a one-part terminal, i.e. it is a single piece, and it corresponds to the connector part 7 of the terminal of the first embodiment. The terminal is attached to the glazing by means of adhesive 8; preferably a tablet of tack-free adhesive is used as described above. The tablet may be applied to the terminal as indicated by arrow D. Again, an auxiliary connection may be made with solder 21.

Figure 4:
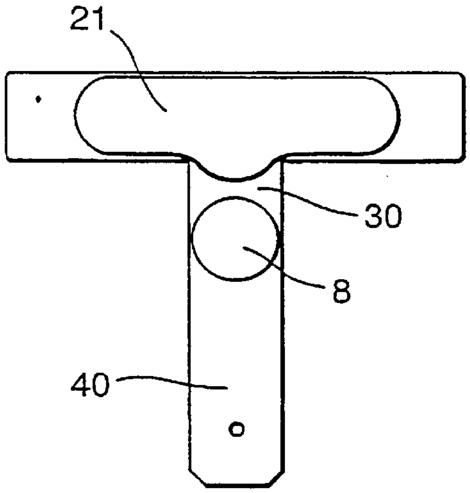
FIG. 4 is a plan view of the terminal of FIG. 3.

FIG. 4 shows the one-part terminal 30 in plan view, with adhesive 8 and solder 21 applied. It is advantageous for the tablet of adhesive to be positioned near the base of the spade connector 40, where it can resist any bending moment created during application of a corresponding female connector to the male spade 40, when the spade can act as a lever. The solder joint is thereby protected from damage.

FIGS. 5 (*a*)–(*c*) show shaped tablets 50, 51, 52 of adhesive, the tablet being pre-shaped to suit the shape of the terminal. Pre-shaping reduces waste, improves conformity to the terminal surface and improves flow control during application of adhesive. A stronger and neater bond is thereby obtained, and this technique may be used with either embodiment of terminal.

In FIG. 5(*a*), a T-shaped block 50 of adhesive is shown, which is suitable for use in the correspondingly T-shaped part of the terminal (i.e. where the limbs of the "T" cross, one limb being the spade). FIG. 5(*b*) shows a thin rectangular block 51 of adhesive and FIG. 5(*c*) shows a thin cylindrical tablet 52 of adhesive.

There are many suitable adhesives for attaching terminals to glazing. Polyurethanes are a suitable class of adhesives, including moisture-cured polyurethane (e.g. Betaseal HV3 available from Gurit-Essex AG of Freienbach, Germany), moisture/heat cured polyurethane (e.g. Sika 360 HC available from Sika AG of Switzerland), reactive hot melt polyurethane (e. g, PUR-FECT 310 available from National Starch & Chemical Company of Bridgewater, N.J., USA, a member of the ICI Group), two component polyurethane, and other polyurethane-based compositions (such as Techbond PUR available from A. Raybond SARL of 68300 Saint-Louis, France). A further suitable class of adhesives is that of epoxy based compositions, e.g. Raybond's Techbond EPO. Also suitable are structural adhesive tapes (e.g. 3M 9214 available from the Minnesota Mining and Manufacturing Company of St. Paul, Minn., USA). Suitable conducting adhesives contain finely dispersed metallic particles in sufficient quantity to pass the required current density.

The preferred tack-free adhesives in tablet form are available from A. Raybond SARL in both epoxy and polyurethane compositions (Techbond EPO and PUR), and terminal base parts can be supplied with the adhesive pre-applied. In a polyurethane-based composition such as Techbond PUR, the polyol and isocyanate reactants are pre-mixed in stoichiometric ratio, but the isocyanate is "end capped" or micro-encapsulated to prevent contact with the polyol. The adhesive is solid at room temperature. Application of heat activates the adhesive by destroying, e.g. melting, the capping or encapsulating membrane and allowing the isocyanate component into contact with the surrounding polyol so that the curing reaction starts. The method of use of these adhesives is as follows.

A pane of glass carrying an electric circuit is provided and cleaned with a cleaner such as Betaseal VP-04604 from Gurit-Essex; a terminal, or terminal base part, with tack-free adhesive pre-applied is also provided. The terminal is positioned over the pane, and rapidly heated to a temperature in the range 100°–140° C. Suitable rapid heating techniques include infra-red lamps, hot air jets, inductive heating or radio frequency dielectric heating. The heat activates the adhesive, and the terminal is pressed into position on the pane. During the initial cooling period the terminal should be held in place, until the temperature has reduced to a value in the region of 60°–80° C. The pane may then be moved, but the bond does not develop full strength until post polymerisation has been completed, which may require up to 20 minutes at room temperature. Note that the pane need not be directly heated, thereby reducing thermal stresses.

As mentioned above, in many cases it will be necessary to make a separate electrical connection between the terminal and the circuit, and a preferred method involves soldering. In this case, the heat of soldering may advantageously also be used to activate the adhesive and eliminate a separate operation. The locations on the terminal body to which solder is applied should be close to those to which adhesive is applied. A soldering tool (which may be automated, e.g. robot-controlled) is then used to solder the terminal in position, and simultaneously heat the adhesive to activate it. The soldering tool may be one which contacts the work, or a hot air soldering technique may be used. Generally, soldering requires a higher temperature than activation of the adhesive, so the temperature attained may be governed by soldering considerations. However, one of the advantages of the invention is that the mechanical bond is provided by the adhesive, so that the solder solely provides an electrical connection. Consequently, solders may be used which have a lower melting point than those used in the prior art, where both mechanical and electrical considerations apply.

In practice, certain types of adhesive are activated by melting them, and so the heat used to melt the solder preferably also melts the adhesive. It is therefore advantageous to select an adhesive and a solder which have similar melting points. Suitably, the adhesive and solder have melting points within 20° C., preferably 10° C., most preferably 5° C. of each other.

What is claimed is:

1. A glazing provided with an electric circuit including an electrically conducting substrate and a terminal for making electrical connection thereto, the glazing comprising a pane of sheet glazing material which carries the electric circuit, wherein the terminal is attached to the substrate by both adhesive and solder, such that the adhesive bears the mechanical load on the terminal and the solder provides the electrical connection between the terminal and the substrate.

2. A glazing as claimed in claim 1, wherein the terminal comprises separate base and connector parts which are adapted to mutually engage, and the base part of the terminal is attached to the substrate by adhesive.

3. A glazing as claimed in claim 1, wherein the adhesive is one which is activated or cured by heat.

4. A glazing as claimed in claim 1, wherein the adhesive is electrically conducting.

5. A glazing as claimed in claim 1, wherein the adhesive and solder have melting points within 20° C., preferably 10° C., most preferably 5° C. of each other.

6. A glazing as claimed in claim 1, wherein the electrically conducting substrate is made from an ink which is applied to the glazing, dried, and fired to provide a durable conducting path.

7. A method of making a glazing provided with an electric circuit including an electrically conducting substrate and a terminal for making electrical connection thereto, comprising the steps of:

providing a pane of sheet glazing material carrying the electric circuit and substrate, and attaching the terminal to the substrate with both adhesive and solder, such that the adhesive bears the mechanical load on the terminal and the solder provides the electrical connection between the terminal and the substrate.

8. A method as claimed in claim 7, wherein the adhesive is provided in the form of a tack-free tablet which is placed in contact with the terminal.

9. A method as claimed in claim 8, wherein the tablet is pre-shaped to match the part of the terminal that the tablet is in contact with.

10. A method as claimed in claim 7, wherein the adhesive is pre-applied to the terminal.

11. A method as claimed in claim 7, wherein the adhesive is heated to activate or cure it.

12. A method as claimed in claim 7, wherein the heat of soldering also activates or cures the adhesive.

13. A method as claimed in claim 7, wherein the electrically conducting substrate is made from an ink which is applied to the glazing, dried, and fired to provide a durable conducting path.

14. A glazing as claimed in claim 2, wherein the adhesive is one which is activated or cured by heat.

15. A glazing as claimed in claim 2, wherein the adhesive is electrically conducting.

16. A glazing as claimed in claim 3, wherein the adhesive is electrically conducting.

17. A glazing as claimed in claim 2, wherein the adhesive and solder have melting points within 20° C., preferably 10° C., most preferably 5° C. of each other.

18. A glazing as claimed in claim 3, wherein the adhesive and solder have melting points within 20° C., preferably 10° C., most preferably 5° C. of each other.

19. A glazing as claimed in claim 2, wherein the electrically conducting substrate is made from an ink which is applied to the glazing, dried, and fired to provide a durable conducting path.

20. A glazing as claimed in claim 3, wherein the electrically conducting substrate is made from an ink which is applied to the glazing, dried, and fired to provide a durable conducting path.

* * * * *